United States Patent [19]

Bennett et al.

[11] 4,411,756

[45] Oct. 25, 1983

[54] BOILING COOLANT OZONE GENERATOR

[75] Inventors: Douglas L. Bennett, Macungie; Donald C. Amoss, Quakertown, both of Pa.

[73] Assignee: Air Products and Chemicals, Inc., Allentown, Pa.

[21] Appl. No.: 481,026

[22] Filed: Mar. 31, 1983

[51] Int. Cl.³ .............................................. C01B 13/11
[52] U.S. Cl. ................................. 204/176; 422/186.19
[58] Field of Search ................... 204/176; 422/186.18, 422/186.19, 186.2

[56] References Cited

U.S. PATENT DOCUMENTS

| | | | |
|---|---|---|---|
| 2,822,327 | 2/1958 | Hammesfahr et al. | 204/176 |
| 3,730,874 | 5/1973 | Trub | 204/321 |
| 3,921,002 | 11/1975 | Williams et al. | 250/533 |
| 4,013,567 | 3/1977 | Emelyanov | 422/186.19 |
| 4,234,800 | 11/1980 | Kenly et al. | 250/540 |

Primary Examiner—John F. Niebling
Attorney, Agent, or Firm—Geoffrey L. Chase; E. Eugene Innis; James C. Simmons

[57] ABSTRACT

An ozone generator is set forth wherein the production of ozone is increased by the more efficient cooling of the generator electrodes and therefore the discharge gap where the ozone forms. The cooling is effected by the use of a boiling coolant fluid which has a high heat transfer capacity. Additionally the electrode structure is made more rigid for increased life in the presence of boiling cooling fluid. A method of ozone preparation is also set forth. Alternately cooling can be enhanced by the introduction of a gas into the coolant to enhance coolant turbulence without boiling the coolant.

29 Claims, 5 Drawing Figures

BOILING COOLANT OZONE GENERATOR

TECHNICAL FIELD

The present invention is directed to the production of ozone from an oxygen-containing gas. More specifically, the invention is directed to the production of ozone in a corona discharge region which is developed between two oppositely charged electrodes. The invention is further directed to the improved cooling and operational efficiency of a corona discharge ozone generator and to achieving increased cell life in such a generator.

BACKGROUND OF THE PRIOR ART

Ozone has become increasingly important in the purification or disinfection of water supplies, as well as the treatment of waste water streams or sewage treatment.

Ozone is generally produced in a corona discharge by the passage of an oxygen-containing gas, such as air, oxygen-enriched air, or pure oxygen through the discharge region. The corona discharge is produced by an electric discharge field between two electrodes of different electrical potential.

Early attempts at providing commercial quantities of ozone utilized flat plate electrodes positioned adjacent one another with a discharge space there between. An example of such an ozone generator is shown in U.S. Pat. No. 2,822,327. In addition, that patent also shows the more popularly used present day ozone generator structure wherein an inner tubular electrode is placed concentrically within an outer tubular electrode.

Ozone generators have been constructed wherein the inner and outer electrodes comprise metal tubes. Such a structure is demonstrated in U.S. Pat. No. 3,730,874. This patent has a dielectric tube placed between the outer and inner metallic electrodes. A cooling chamber is located between the dielectric tubular member and the inner metallic electrode. The coolant which is supplied to the space between the inner electrode and the dielectric member is taught to be water which acts as an electrical ground for the inner electrode. The spaced coolant chamber is designed to assure flow of liquid coolant near the surface of the inner electrode.

Alternately, it has been contemplated to cool an ozone generator by the use of cryogenic fluids. In U.S. Pat. No. 3,921,002, an ozone generator is cooled by the utilization of liquid oxygen. The liquid oxygen is maintained inside the inner electrode while gaseous oxygen is circulated between the inner and outer electrodes and converted to ozone. Because of the very low temperature of the liquid oxygen, the ozone, as it is formed, is liquefied.

Ozone generators have been contemplated wherein the outer and inner electrodes are individually cooled by a liquid coolant. In U.S. Pat. No. 4,234,800, an ozone generator is shown in which the inner ground electrode is cooled by a flow of water through the entire void space inside the tubular ground electrode. The outer high voltage electrode is cooled by oil which flows between the outer electrode and the generator's outer superstructure. Such a system requires two separate coolant circulation systems.

The operation of ozone generators creates significant levels of heat due to the formation of ozone from oxygen and due to the electric current flowing through the electrodes of the generator and forming the corona discharge. Excessive temperature created by this heat in an ozone generator hampers the efficient production of ozone by decomposing the product ozone shortly after its formation. Excessive temperature or excessive variation in temperature also diminishes the life of the ozone generator itself, particularly the structurally weak dielectric elements, but to a lesser extent, the electrodes also may be adversely affected by excessive temperature during operation. The prior art has attempted to reduce the occurrence of excessive heating in ozone generators by the introduction of various liquid coolants into the areas surrounding one or both of the ozone generator electrodes. However, cooling capability of a liquid coolant supplied to the generally large areas between the generator containment walls and the nondischarge surfaces of electrodes suffers from the low heat transfer capability resulting from the flow characteristics of the liquid near the surfaces of such electrodes. As liquid coolant flows through a conduit or its flowpath in the generator, a reduced flow rate is experienced at the outer areas of the liquid flow due to frictional forces with the conduit or generator surface. At the core of liquid flow, the flow rate remains high because of the reduction of frictional forces. Attempts have been made to increase the relative flow of coolant near the electrode surface to create turbulent flow in order to enhance heat transfer capability by the reduction in size of the space between the electrode and the containment wall for the coolant flow. However, this solution requires additional apparatus and incurs the potential for arcing across reduced dimension spacing between electrode and generator structure. The present invention overcomes the drawbacks of the prior art and efficiently resolves the problem of over heating or excessive temperatures by the use of a unique coolant system having increased heat transfer capability.

Additionally, the present invention overcomes the problem of weak structural integrity of the dielectric elements in an ozone generator.

BRIEF SUMMARY OF THE INVENTION

The present invention comprises an ozone generator apparatus for producing ozone from an oxygen-containing gas by corona discharge, comprising two spaced electrodes supplied by a high voltage, and means for cooling the ozone by contacting an electrode with a coolant, the improvement comprising means for effecting the boiling of the coolant utilizing the heat in the generator whereby the resulting boiling coolant fluid contacts at least one electrode in heat exchange communication so as to enhance the heat transfer capability and to extend the life of the apparatus.

Preferably the ozone generator comprises an inner tubular electrode which is concentrically spaced from an outer tubular electrode in which a tubular dielectric structure, such as glass or ceramic, is placed between the two electrodes in a concentric manner. The electrode assembly is situated within a container which has means for boiling a coolant which circulates around the non-discharge surfaces of the electrodes, but not in the space or region between the electrodes where an oxygen-containing gas is admitted, and ozone is formed. The vapor of the boiling coolant fluid is condensed against a second coolant by indirect heat exchange between the vapor of the boiling coolant and the second coolant. The condensed boiling coolant is then returned to the area adjacent the electrodes for further coolant duty wherein it is boiled again by the heat in the generator.

In a simplified generator structure, the use of boiling coolant fluid with a condenser overhead allows for natural circulation of the boiling coolant without the assistance of pumping apparatus for coolant circulation. This thermo-siphon effect reduces the capital costs of the ozone generator of the present invention.

In the preferred embodiment of the present invention, the generator has means for effecting boiling comprising nucleation sites to promote bubble formation of the boiling coolant fluid on the non-discharge surfaces of the electrodes. The enhancement of the bubble nucleation and two-phase heat transfer can be accomplished by the roughening of the surface of the electrode contacting said coolant, the application of a high heat flux surface preparation such as plasma deposition of metal, or the provision of a heating element at the lower part of the generator cell in order to initiate bubbles of boiling coolant fluid at the lower region of the circulation of the coolant past the surface of the generator electrodes. The heater may consist of a small resistance heater located adjacent the electrode elements or it may consist of a high resistivity area on the electrode, preferably of the electrode associated with the dielectric material.

Advantageously, one of the electrodes of the ozone generator is comprised of a metallic pipe which is coated with a dielectric material. This provides for structural integrity of the dielectric material. Preferably, the metal pipe is steel or aluminum.

A further embodiment of the present invention is the use of a baffle adjacent the electrodes in order to contain rising vapor bubbles of the boiling coolant fluid close to the surface of the electrode to improve heat transfer capability and reduce the potential for gapping to other structural elements of the ozone generator.

The present invention also comprises a method for producing ozone in a generator which is cooled with a boiling coolant fluid comprising generating ozone from an oxygen-containing gas by corona discharge between two spaced electrodes and cooling the ozone by contacting an electrode in heat exchange communication with a coolant which is caused to boil by the heat generated by ozone production. This provides an improved heat transfer capability in the boiling coolant fluid and a resulting improved ozone production efficiency.

Alternately, the present invention can comprise an apparatus and method for producing ozone wherein cooling is enhanced by introducing a gas into the coolant through a nozzle in the container wall of the ozone generator in order to create bubbles in the coolant for the enhancement of turbulent flow by the creation of a two phase coolant fluid.

DETAILED DESCRIPTION OF THE INVENTION

Figure 2:
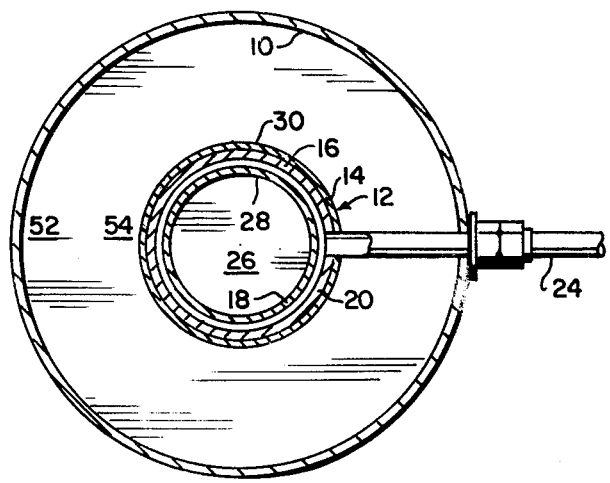
FIG. 2 is a top view taken in section of the ozone generator of the present invention shown in FIG. 1.

The ozone generators of the prior art have been inefficient in the production of ozone due to the decomposition of initially formed ozone by the heat which has developed in the generator and which has not been effectively removed due to the limitations of the known coolant systems for generators. In addition, the coolant systems presently used in ozone generators require expensive piping and pumping apparatus in order to implement the cooling function. In the case of a breakdown or power loss in the pumping means, such systems are effectively without any significant level of cooling capability and produced ozone is more rapidly decomposed.

Coolant, as it flows past the non-discharge surfaces of the electrodes of an ozone generator undergoes flow chacteristics in which the flow of the coolant is dissimilar across the entire cross-section of the coolant flow. In other words, as the coolant flows past the electrode surface, frictional forces of the solid and coolant interface prevent the coolant from flowing at a rate equal to the coolant flow near the center or core of the coolant's passage. Therefore, despite apparently high rates of coolant flow, the effective flow of coolant near the surface of the electrodes, where it is most imperative to have efficient cooling function, is greatly reduced from that necessary for good heat removal. Coolant also does not undergo significant turbulent flow, that flow which is not parallel to the cooling surface. One manner of resolving the static condition of coolant near the solid-coolant interface has been to reduce the cross-sectional area of coolant flow in order to force a more uniform flow across the flow path of the coolant and, specifically, the flow near the solid-coolant interface. This enhances turbulent flow, but of course, reduces total coolant flow, as well as reducing the space between structural members. Such space can be important when an electrode must be isolated from any grounding support structure.

The present invention has overcome the drawbacks of heat buildup in an ozone generator, with its attendent decomposition of formed ozone, by the use of means for effecting the boiling of coolant in the ozone generator. The boiling coolant fluid has a dramatically higher heat transfer capability than the liquid coolants of the prior art. The attendant advantage of using a coolant with a high heat transfer capability, such as a boiling liquid, is that ozone which is formed in the generator is less likely to decompose, with the resultant increase in ozone production efficiency. The use of a high heat transfer coolant, such as boiling coolant fluid, is particularly important in cooling the dielectric material or an electrode which is in contact with a dielectric material. The dielectric material is preferably utilized to avoid gapping or arcing between the several electrodes of the generator. However, the dielectric also has the effect of preventing good heat conductance from the discharge zone to the electrode and the coolant fluid. A metal electrode, unencumbered with dielectric material, has a greater facility for the conductance and removal of heat from the discharge zone, and therefore, the gaseous medium in which the product ozone exists. Therefore, it is beneficial to cool a dielectric containing electrode with the boiling coolant fluid in order to optimize the heat transfer that does occur through such electrode. At least some ozone generators do not use dielectric and in such instances boiling coolant improves the heat transfer through the entirely metal electrodes.

Boiling coolant fluid comprises a coolant in the liquid form which is susceptible to boiling to become a fluid of two phase composition containing liquid and gas or vapor at the pressures and temperatures at which the generator is maintained and at which the electrodes are designed to operate. Optimally, the region wherein the ozone exists should be maintained as cool as possible. If the region where the ozone product exits can be maintained relatively cool, the efficiency of ozone production will increase significantly.

The boiling coolant fluid achieves greater heat transfer capability by the combined action of vaporization and the dynamic flow of vapor bubbles adjacent the electrode to be cooled, which induces turbulent flow of the coolant fluid adjacent the electrodes. In boiling the coolant, the point of bubble origination or nucleation generally exists along the surface of the electrode where relativley high temperature exists on the electrode surface. As a bubble of vapor from the coolant forms on the electrode surface, heat is removed from that surface to change the coolant from its liquid state to its vapor state. This boiling or vaporization removes a significant level of heat in comparison to the mere heat exchange of prior art heat exchange liquids, which are merely elevated in temperature without undergoing phase change. This boiling or bubble nucleation specifically occurs at the surface of the hot electrodes when the electrode is used to promote the boiling. Therefore, this heat exchange or cooling function occurs immediately adjacent the area where cooling is most desired, the non-discharge surface of the electrodes, and works contra to the prior art cooling, which occurs in a simple circulated liquid coolant wherein the highest circulation rate occurs in the core of the coolant flow rather than at the extremes of the coolant flow. The heat exchange at the prior art electrode surface is diminished because of diminished coolant flow. Alternately, boiling of the coolant can be caused by heat in the generator other than from the electrodes.

In addition, the formed bubbles of the boiling coolant fluid of the present invention rise through the remaining coolant fluid and in so doing create a dynamic force to further circulate the remaining liquid phase coolant fluid near the surface of the electrode to be cooled. The rising bubbles of boiling coolant fluid create turbulent flow in the coolant or a greater degree of turbulent flow. Turbulent flow consists of flow which circulates from the non-discharge surface of the electrode to the inner or core area of the coolant flow. Bubbles enhance this turbulent flow by creating various eddy currents that draw coolant from the electrode surface into the core of the coolant flow. This turbulent flow is non-parallel to the major coolant flow or the electrode surface being cooled. Such non-parallel flow transfers heat from the electrode to the core of the coolant flow more effectively than heat transfer by conductance through the coolant. Thus by creating turbulent flow in the coolant, the boiling provides a more effective heat transfer for a given coolant flow. This is particularly true of an electrode immersed in coolant having a vertical surface which is being cooled. As bubbles emerge from nucleation sites on the surface of the electrode, they rise adjacent the vertical surface of the electrode due to their reduced density and force additional circulation of the coolant fluid at the extreme edges of the overall coolant flow both in a parallel and non-parallel direction with respect to the major coolant flow. Some of the coolant fluid bubbles impact the surface of the electrode after formation and are believed to form additional bubbles. That is, they are believed to act as seed bubbles or additional nucleation sites for further boiling or bubble origination. This effects a beneficial improvement in the bubbling action around the electrodes and the vaporization of liquid coolant from the surface of the electrodes. Both of these actions, vaporization and dynamic turbulent flow of bubbles increase the heat transfer capability of the coolant fluid against the electrode or electrodes of an ozone generator.

Bubble formation from nucleation sites on the electrodes will generally be adequate dependent upon the selection of the proper coolant, the pressure of the ozone generator vessel and the temperature at which the electrodes will be sustained during operation. However, in order to improve or change the source of the formation of bubbles from the coolant it may be deemed beneficial to provide additional heat input or additional nucleation sites. In order to provide additional heat input, it is contemplated that a small electrical resistance element can be situated within the ozone generator container adjacent the lower region of the electrodes. The resistance heater would provide for an additional source of vapor bubbles from the boiling coolant fluid, and the resistance heater would be situated so that the bubbles rise adjacent to the vertical surface of the electrodes. Alternately, the conductive portion of the electrode may have a high resistance area in the vicinity of its lower region. The high resistance may be created by the inclusion of an additional component to the electrode material or it can be provided by the altered or reduced dimension of the electrode in the vicinity where the heat is to be increased. This later embodiment is particularly appropriate wherein one of the electrodes constitutes a thin layer metal electrode on a dielectric substrate. Additional nucleation sites can be created by the roughening of the electrode surface which is in contact with the boiling coolant fluid. Additional nucleation sites may also be provided by the application of a high heat flux surface preparation to the surface of the electrodes in contact with the boiling coolant fluid. Such a surface preparation would be exemplified by the plasma or flame spray deposition of metal to provide a sponge-like exterior layer.

The means for effecting the boiling of the coolant includes the nucleation sites provided on the electrodes, the high heat flux surface preparations, the auxiliary internal heater as well as attendant exterior heaters or pressure-maintaining apparatus which can effect the boiling of the coolant. Other apparatus can be contemplated for enhancing or causing the coolant to boil during generator operation and these apparatus are deemed to be within the scope of the invention wherein the coolant is caused to boil. It can be contemplated that the use of temperature control equipment or pressure control equipment, such as an auxiliary heat source, or a pressure maintenance valve can be used to effect conditions in the generator so as to cause the coolant to boil. All of these means are considered for such a boiling coolant fluid ozone generator.

Alternately, to create bubbles in the coolant without actually boiling the coolant, a gas introduction means can be incorporated into the generator to create gas bubbles in the coolant and therefore, enhanced turbulent flow of the resulting two phase coolant fluid. This introduction means can constitute an orifice or nozzle in the generator container, preferably located at and discharging gas at the base of the electrodes. The nozzle or orifice would be connected to an appropriate gas conveying conduit. A gas relief valve would be positioned at the upper end of the generator to exhaust and optionally to recycle the gas. Such gases may include nitrogen, oxygen, air and various exhaust gases from industrial processes.

Figure 1:
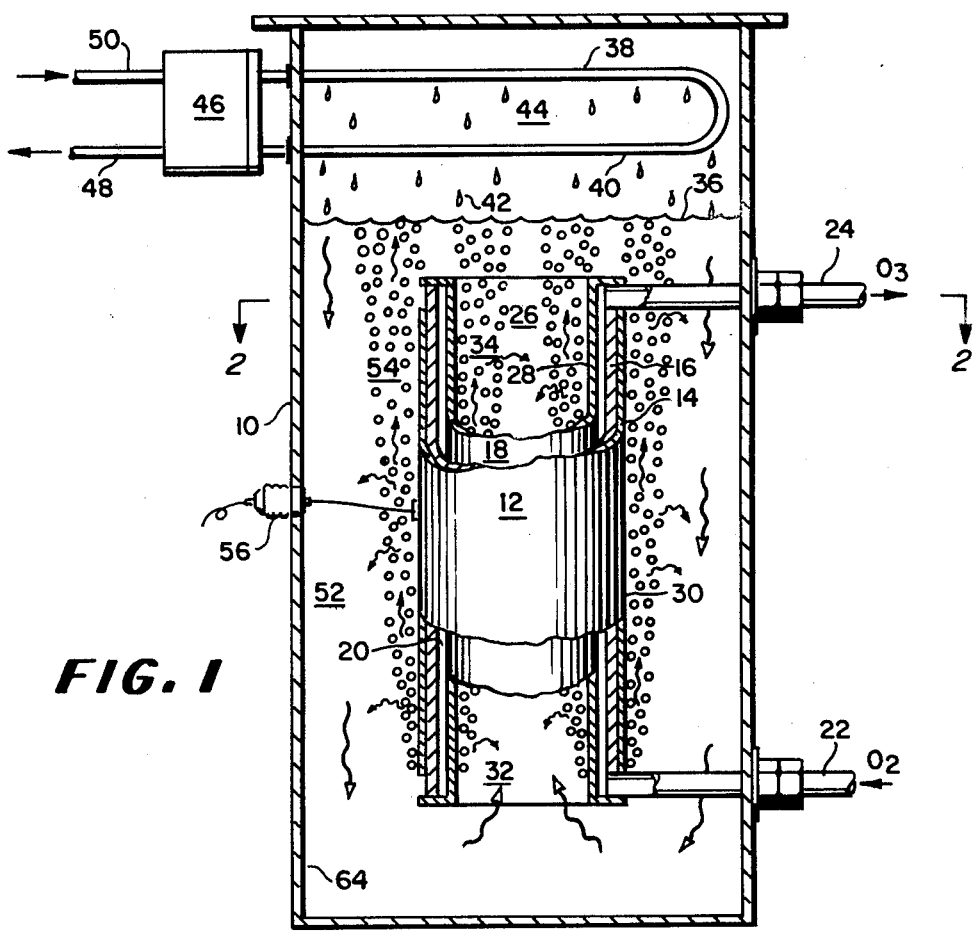
FIG. 1 is a cross-sectional view of the ozone generator of the present invention.

The present invention is deemed to be broadly applicable to ozone generators, but the invention will be described specifically in a preferred embodiment which should not be deemed to limit the invention. As shown in FIG. 1, an ozone generator is shown in cross section wherein the generator is positioned within an exterior container 10 forming the support structure for the generator elements. Inside the container 10 are two electrodes, an outer electrode 12 and an inner electrode 18. The outer electrode comprises a dielectric element 16 which is formed of glass, ceramic or porcelain and a metal electrode element 14 which comprises a steel pipe, an aluminum foil or a vapor deposited metal film. The electrode 12 is formed in a tubular configuration and is concentrically spaced, radially outward from the inner electrode 18. The inner electrode 18 constitutes a metal tubular element, such as steel or aluminum. It is spaced concentrically within the outer electrode 12 to form a corona discharge space or region 20 between the electrode elements. Although not shown in this drawing, both electrodes are supported by known structural means within the container 10. It is necessary to provide insulated support for at least one of the electrodes in order to isolate the electrodes from one another. Although it is not necessary to ground either electrode, it is common practice to ground the inner metal electrode, while the outer composite electrode 12 is considered the high voltage or charged electrode. Alternately, the inner electrode 18 can be formed with the dielectric element 16 and the outer electrode 12 will comprise a metal tube or pipe 14. Either electrode can be formed from a metal pipe for durability and then coated with a dielectric layer. The pipe preferably will have a minimum thickness of 0.01 inches to impart strength to it.

The corona discharge region 20 between the electrodes communicates with an outside gas source through inlet 22 and delivers product ozone through outlet 24. The reactant-product flow could be run in a reverse manner, if desired. In operation, an oxygen-containing gas such as air, oxygen-enriched air, or pure oxygen is admitted through line 22 into the corona discharge region 20 between the electrodes. The electrodes generally have a potential of 5,000–50,000 volts between them, which potential creates the corona discharge due to the electric field there between. Although the inventors do not want to be held to a specific theory of ozone formation, it is believed that the electric discharge acts to disassociate the diatomic oxygen gas, and ozone is formed by the recombination of the atomic oxygen with a diatomic oxygen in the discharge region 20. This ozone formation results in significant levels of heat being given off in the region 20, and this heat is in turn absorbed by the electrodes 12 and 18 and the dielectric material 16. If the heat is not removed from the system, the ozone product decomposes to a large extent, and the production is reduced in efficiency. Therefore, in order to maintain a relatively low and stable temperature in the discharge region 20, a coolant is passed in heat exchange manner along the non-discharge surfaces 28 and 30 of the electrodes. Specifically, coolant is passed along the inner surface 28 of the inner electrode 18 and along the outer surface 30 of the outer electrode 12. The coolant flows from the bottom of the container 10 upward along the vertical surfaces of the electrodes. The coolant picks up heat from the electrodes and the electrodes therein transfer heat from the discharge region 20 to the coolant. In the present invention, the coolant constitutes a liquid dielectric material which has a boiling point below the operational temperature of the electrodes at the pressure at which the system is designed to operate. Although the system may be designed to operate at any of a wide range of temperatues and pressure, it is generally deemed beneficial to operate at between approximately atmospheric pressure and several atmospheres of pressure and close to ambient temperature. The inner metal electrode will conduct heat from the discharge gap 20 very readily to the coolant 26. Therefore this electrode will be approximately at the same temperature as the coolant. However, the composite electrode 12, which has a dielectric material 16 with insulating capability, will sustain a higher temperature despite its being in heat exchange contact with the same coolant. Therefore, it is expected that the highest temperature will be maintained in the discharge region 20 with reduced temperature in the metal electrode 18 and sustained temperature of an intermediate level in the dielectric material 16 and the electrode layer 14.

Although the coolant 26 which circulates within the container 10 and around the electrode elements 12 and 18 may be any coolant with the particular attributes of appropriate saturation pressure and appropriate dielectric strength, it is deemed to be preferred that a dielectric coolant such as a fluorocarbon, particularly dichlorofluoromethane or trichlorofluoromethane, be utilized as the coolant. Alternately, a mixed component coolant could be utilized. Preferably, the coolant will be selected to have a saturation vapor pressure near ambient pressure at the particular temperature the generator will be operated. Ambient operating pressures are most convenient for economic operation. However, the generator can be operated at a pressure generally in the range 0.1 to 10 atmospheres, preferably up to 2–3 atmospheres. The coolant would be selected according to its saturation vapor pressure such that it would closely coincide with the operational temperature and pressure. This operational condition is significantly dependent upon the temperature of the outside refrigerant provided to the generator through the condenser. The coolant operates by circulating past the cooling surfaces 28 and 30 of the electrodes, while a portion of the coolant liquid is vaporized by the heat of the electrodes to produce boiling coolant fluid. The vaporized coolant forms bubbles which rise adjacent the electrodes. Heat is removed from the electrode surface during the act of vaporization and additional heat is removed as the bubbles create a dynamic turbulent flow of coolant fluid past the remaining portion of the electrode surfaces and into the core of the coolant flow in the form of eddy currents. This flow 34 and 54 is created by the rise of the coolant bubbles through the liquid media. As the bubbles rise they create currents of remaining liquid to rise and become agitated near the electrodes surfaces. This action is an important aspect of the present invention and operates in contradistinction to the flow characteristics of prior art coolants which are not allowed to boil as they perform their heat exchange duty in the ozone generators of the prior art. By using a boiling coolant fluid, the turbulent flow 34 and 54 of coolant near the electrode surface is enhanced rather than diminished as is the case with the single phase coolant flow of the prior art. However, the use of a two phase coolant is not deemed to provide the heat transfer capacity of the combined effect of boiling coolant fluid. In boiling coolant fluid, the heat transfer capacity is a combination of the vaporization of liquid coolant, as well as the increased circulation and, therefore, heat exchange capability of the coolant. As the boiling coolant fluid, comprising liquid coolant and vapor bubbles, rises, the vapor bubbles reach the surface 36 of the coolant fluid. The vapor phase coolant 44 then comes in contact with a condenser 38, which can have coils or contact surfaces 40 available for heat exchange of the condenser with the vapor phase coolant 44. The condenser condenses the vapor phase coolant 44 into liquid drops 42 of coolant which then return by gravity to the reservoir of boiling coolant fluid 26.

This recently condensed boiling coolant circulates downward by the action of the boiling coolant fluid rising adjacent the electrodes. The former coolant descends through the container 10, such as at 52, towards the base of the container. As the recondensed coolant and residual coolant within the container 10 become rewarmed and approach the surfaces 28 and 30 of the electrodes, the liquid coolant again boils to form a boiling coolant fluid which passes up adjacent the vertical surfaces 28 and 30 of the electrodes. This circuitous path of the coolant through its liquid and vapor phases constitutes a thermo-siphon circulation which operates without the necessity of a pressurized source of coolant or circulating pumps and their attendant power requirements. This natural circulation based on the thermo-siphon effect constitutes yet another advantage of the present invention. The ozone generator cell of the present invention can operate continuously without coolant loss, whereas the prior art ozone generator cells may require shut down if a pumping apparatus loses power or breaks down. However, the boiling coolant fluid feature of the present system can also be used in a generator which has a pump to recirculate the coolant. The beneficial improvement in heat transfer would still be achieved.

The condenser 38 is generally believed to be sufficient if ambient temperature cooling water is supplied through line 50 and removed after duty in line 48. However, it may be deemed worthwhile to operate the electrodes at temperatures below the available ambient cooling water. Under these circumstances, the heat removal requirements of the condenser may require that a refrigeration source be utilized in providing the condensing effect in the condenser coil 38. In this case, the condenser 38 may be connected with a refrigeration source or heat pump 46, in which the heat pump refrigerant may be directly circulated through the condenser 38 and the ambient cooling water in lines 50 and 48 is exchanged against the warm end of the heat pump 46. Alternately, the cooling water in line 50 could be heat exchanged against a refrigeration source at 46 and pass directly through the condenser 38 as subambient cooled cooling water.

Figure 3:
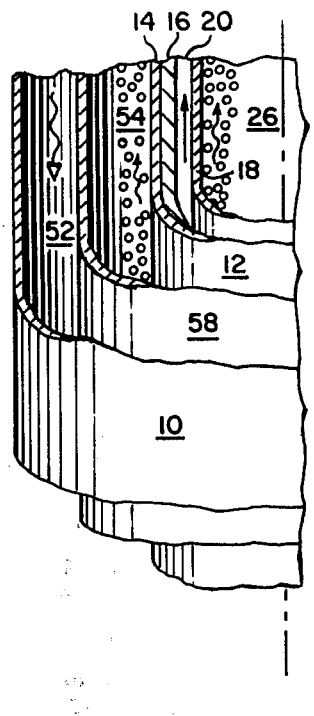
FIG. 3 is a partial sectional view of the ozone generator of the present invention shown in FIG. 1 wherein an annular baffle is included in the generator.

The concentric spacing of the electrodes 12 and 18 is readily demonstrated in FIG. 2. As can be seen in FIG. 2, the volume occupied by boiling coolant fluid in the present invention such as at 26/34 and 52/54 does not have to be diminished in order to provide sufficient boiling coolant fluid flow along the surfaces of the electrodes. Therefore, a large quantity of coolant may be provided around the electrodes to provide a dielectric insulating medium, as well as a heat sink. With the provision of sufficient volume of boiling coolant fluid in the area 54 outside the outer electrode 12 and inside the inner surface 64 of the container 10, no threat of grounding of the charged electrodes is present. This volume can be made as large as necessary to provide the insulting effect without diminishing the coolant efficiency along the surface of the electrodes. This benefit is not realized in the prior art ozone generators where the coolant flow along the electrode surface is diminished, and coolant volume is therefore designed to be restricted in order to force flow along such surfaces. However, it is contemplated for the present invention that some installations will wish to diminish or minimize the volume of boiling coolant fluid between the outer electrode 12 and the container 10. This existence of a high density of coolant bubbles in the region bounded by surfaces 30 and 64 may create an alteration in the dielectric strength of the fluid maintained between those surfaces. In order to insure that adequate insulation is maintained between these surfaces and that the bubbles formed congregate near the surface of the electrodes, it is contemplated that an annular baffle 58 as shown in FIG. 3 can be provided in the ozone generator. The annular baffle 58 would be positioned concentrically outward from the outer electrode 12 and would constitute an insulating or dielectric element. The baffle prevents the reduction of the effective dielectric strength of the coolant outside the baffle.

As stated previously, it may be beneficial to enhance the vapor and bubble formation of the boiling coolant fluid on the electrode surfaces 28 and 30 with means for effecting boiling. Enhancement of the boiling sites or nucleation sites of these surfaces can be performed by roughening the surfaces during fabrication. In the case of the inner steel electrode 18, the coolant surface 28 may be roughened to provide cavities in the metal at which cavities the coolant will bubble more readily. These cavities are referred to as nucleation sites. On the outer electrode 12 such nucleation sites may be formed by roughening the dielectric substrate 16 prior to the vapor deposition of the outer electrode element 14. This would create similar cavities which would form nucleation sites for the boiling coolant fluid. Alternately, the outer electrode 12 could be formed with an additional dimension of metal coated on the dielectric substrate 16. The additionally thick metal 14 would then be post-roughened to provide nucleation sites. Finally, the electrode surfaces 28 and 30 may be treated with a high heat flux surface preparation such as plasma or flame spray deposition of metal to provide additional nucleation sites.

Under some circumstances, it may be deemed more expedient to provide a nucleation site or bubble formation site which is located at the lower region of the vertical electrode surfaces 28 and 30. This would allow for a high density of vapor bubbles to traverse a significant portion of the vertical dimension of the electrodes with resulting increased heat transfer capacity and the opportunity for additional bubble formation. The latter phenomena is derived from the known occurrence of additional bubble formation as a result of established bubble contact on or approach to a nucleation surface.

Figure 4:
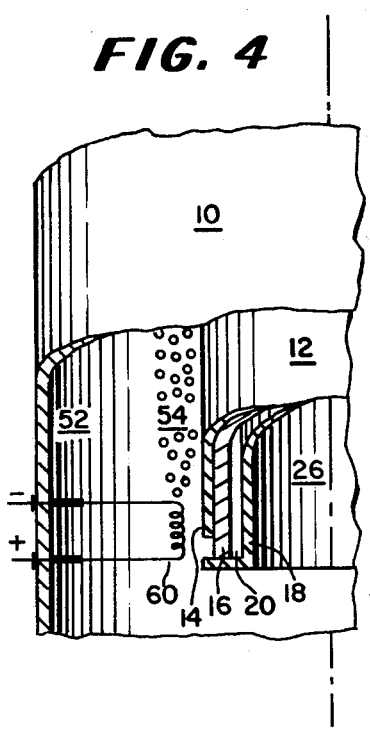
FIG. 4 is a partial sectional view of the ozone generator of the present invention as shown in FIG. 1 including a resistance heater element.
Figure 5:
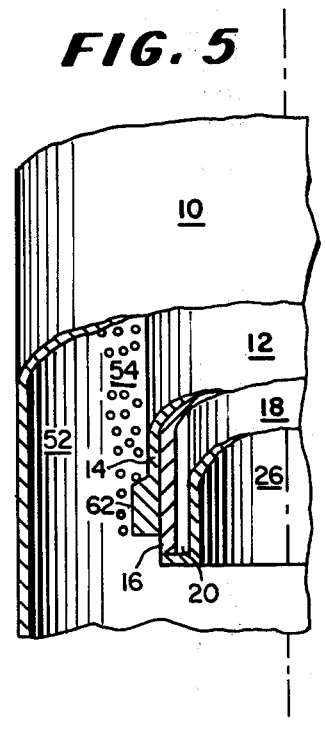
FIG. 5 is a partial sectional view of the ozone generator of the present invention as shown in FIG. 1 including a high resistivity region on the outer electrode.

In other words, it is known that in the boiling of a liquid, vapor bubbles will initiate the formation of additional bubbles when such bubbles contact or approach the appropriate nucleation site. In order to take advantage of such a phenomenon, it is contemplated in the present invention that a source of bubbles be provided near the lower region of the electrode surfaces, 28 and 30. FIG. 4 and FIG. 5 show two embodiments of this concept. In FIG. 4, a small electrical resistance heater 60 is placed near the base of the electrodes adjacent to their non-discharge surfaces 28 and 30 in order to form an initiation site for the boiling of the coolant. Such a heater 60 may be placed around the base of each electrode 12 and 18, although it is not shown. Alternately, as shown in FIG. 5, a high resistivity region 62 may be formed on the electrodes in order to sustain a higher temperature for a given electrical potential on the electrodes near the base of the electrodes. This is particularly applicable to the outer electrode 12 which is formed of a composite of a dielectric substrate 16 and a potentially vapor deposited metal film 14. In forming the metal film electrode 14, a dopant or altered dimension area can be formed near the lower region of the electrode as shown at 62 in FIG. 5. This again, would create a high temperature region on the electrode with the attendant formation of a nucleation site at the base of the electrode. A similar structure can be formed on electrode 18, although it is not shown. Both of these additional embodiments would provide a high density of bubbles which would rise adjacent the electrodes with the improved effect of dynamic turbulent flow and additional bubble formation. These means for effecting boiling can be used in conjunction with other boiling promoters, or they can be used individually.

The present invention has been described with emphasis on the cooling function of the ozone generator. The aspects of the ozone generator of the present invention with regard to the actual formation of ozone and the circulation of the feed and product gases is within the working knowledge of those skilled in the art and will not be further discussed herein. Other than the specific features described above, the ozone generators of the present invention operate in a manner similar to those presently known and available. In addition, it is contemplated that the unique aspects of the present invention are applicable to a wide variety of specific ozone generating apparatus. For example, it is believed that the concept of the present invention would be appropriate to ozone generation as described in U.S. Pat. No. 4,234,800, and such reference is hereby incorporated by reference, particularly with respect to its discussion of ozone generation in general.

The present invention has been described in a specific preferred embodiment utilizing a concentric electrode structure. However, it is deemed that the invention would have equal applicability to other ozone generator structures such as a plate to plate apparatus as shown in U.S. Pat. No. 3,822,327. It is also contemplated that the present invention would be applicable to a multicelled ozone generator in which a plurality of paired electrodes are assembled in a large containment vessel and supplement one another in the formation of a large quantity of ozone. Therefore, the scope of the present invention should not be limited to the specific embodiment set forth above, but rather should be ascertained from the claims which follow.

We claim:

1. In an apparatus for producing ozone from an oxygen-containing gas by corona discharge, comprising two spaced electrodes supplied by a high voltage, and means for cooling the ozone by contacting an electrode with a coolant, the improvement comprising means for effecting the boiling of the coolant utilizing the heat in the generator whereby the resulting boiling coolant fluid contacts at least one electrode in heat exchange communication so as to enhance the heat transfer capability and to extend the life of the apparatus.

2. The apparatus according to claim 1 wherein a dielectric material is interposed between the electrodes.

3. The apparatus according to claim 2 wherein said means for cooling includes a boiling coolant fluid which contacts both electrodes.

4. The apparatus according to claim 3 wherein said electrodes have a tubular configuration and are disposed concentrically within a container which forms a cooling fluid chamber with an inner cooling zone which is interior to the inner concentric electrode and an outer cooling zone which is exterior to the outer electrode.

5. The apparatus according to claim 4 wherein said chamber comprises means for recycling the boiling coolant fluid.

6. The apparatus according to claim 5 wherein said recycling means comprises a thermo siphon consisting of a condenser for condensing the vapor of said boiling coolant fluid and a return path for said condensed coolant.

7. The apparatus according to claim 5 wherein said recycling means includes a pump that recirculates condensed coolant to the electrodes.

8. The apparatus according to claim 1 further comprising a tube concentrically positioned between said outer electrode and said container to form an annular baffle which prevents the reduction of the effective dielectric strength of the coolant outside the baffle.

9. The apparatus according to claim 4 wherein said outer electrode and said dielectric material comprise a glass lined stainless steel pipe.

10. The apparatus according to claim 9 wherein said pipe has a minimum wall thickness of 0.01 inches.

11. The apparatus according to claim 4 wherein said inner electrode comprises a stainless steel pipe lined with said dielectric material.

12. The apparatus according to claim 4 wherein said inner electrode comprises an aluminum pipe lined with said dielectric material.

13. The apparatus according to claim 4 wherein said boiling coolant fluid comprises a fluorocarbon.

14. The apparatus according to claim 4 wherein the means for effecting boiling comprises electrodes having a rough surface in contact with said boiling coolant fluid.

15. The apparatus according to claim 1 wherein the means for effecting boiling comprises apparatus including a heater at the lower region of at least one electrode.

16. The apparatus according to claim 1 wherein at least one electrode comprises the source of heat to cause the coolant to boil.

17. In a method for producing ozone in an ozone generator comprising generating ozone from an oxygen-containing gas by corona discharge between two spaced electrodes and cooling the ozone by contacting an electrode with a coolant, the improvement for providing an enhanced heat transfer capability and resulting improved ozone production efficiency comprising cooling said ozone by contacting at least one electrode in heat exchange communication with a boiling coolant fluid whereby the heat in the generator causes the coolant to boil.

18. The method of claim 17 wherein a dielectric material is interposed between said electrodes.

19. The method of claim 17 wherein the vapor of the boiling coolant fluid is condensed and recycled past the electrodes.

20. The method of claim 19 wherein the coolant fluid is recycled by the thermo-siphon effect.

21. The method of claim 17 wherein both electrodes are contacted with the boiling coolant fluid.

22. The method of claim 17, wherein the coolant is a fluorocarbon.

23. The method of claim 19 wherein the condensed coolant fluid is recycled by a pump.

24. The method of claim 17 wherein the heat generated by ozone production causes the coolant to boil.

25. The method of claim 17 wherein the heat of at least one electrode causes the coolant to boil.

26. The method of claim 17 wherein the heat causing the coolant to boil is supplied at least in part from an auxiliary heater.

27. In an apparatus for producing ozone from an oxygen-containing gas by corona discharge, comprising two spaced electrodes supplied by a high voltage, and means for cooling the ozone by contacting an electrode with a coolant, the improvement comprising means for creating bubbles in the coolant utilizing a gas whereby the resulting two phase coolant fluid contacts at least one electrode in heat exchange communication so as to enhance the heat transfer capability and to extend the life of the apparatus.

28. The apparatus of claim 27 wherein said means for creating bubbles in the coolant comprises a nozzle which discharges a gas into the coolant.

29. In a method for producing ozone in an ozone generator comprising generating ozone from an oxygen-containing gas by corona discharge between two spaced electrodes and cooling the ozone by contacting an electrode with a coolant, the improvement for providing an enhanced heat transfer capability and resulting improved ozone production efficiency comprising cooling said ozone by contacting at least one electrode in heat exchange communication with a two phase coolant fluid whereby a gas introduced into the generator causes the coolant to have increased turbulence.

* * * * *